(12) United States Patent
Nakazawa

(10) Patent No.: US 11,911,845 B2
(45) Date of Patent: Feb. 27, 2024

(54) LIGHTGUIDE DEVICE AND LASER PROCESSING DEVICE

(71) Applicant: KAWASAKI JUKOGYO KABUSHIKI KAISHA, Kobe (JP)

(72) Inventor: Mutsuhiro Nakazawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 174 days.

(21) Appl. No.: 17/250,248

(22) PCT Filed: Jun. 19, 2019

(86) PCT No.: PCT/JP2019/024302
§ 371 (c)(1),
(2) Date: Dec. 21, 2020

(87) PCT Pub. No.: WO2020/004177
PCT Pub. Date: Jan. 2, 2020

(65) Prior Publication Data
US 2021/0260695 A1    Aug. 26, 2021

(30) Foreign Application Priority Data
Jun. 25, 2018    (JP) .................................. 2018-119597

(51) Int. Cl.
*B23K 26/082*    (2014.01)
*B23K 26/38*    (2014.01)
(Continued)

(52) U.S. Cl.
CPC .......... *B23K 26/0821* (2015.10); *B23K 26/38* (2013.01); *G02B 26/124* (2013.01); *G02B 26/125* (2013.01); *B23K 2101/18* (2018.08)

(58) Field of Classification Search
CPC .............. B23K 26/046; B23K 26/0643; B23K 26/402; B23K 26/38; G02B 26/126; G02B 26/124
See application file for complete search history.

(56) References Cited

U.S. PATENT DOCUMENTS 2,844,648 A * 7/1958 Rosenthal ................ H04N 3/08
                                                358/487
8,300,291 B2    10/2012 Shikii et al.
(Continued)

FOREIGN PATENT DOCUMENTS

JP        64-24217      1/1989
JP        11-149052     6/1999
(Continued)

*Primary Examiner* — Thien S Tran
(74) *Attorney, Agent, or Firm* — Fay Kaplun & Marcin, LLP

(57) ABSTRACT

A light guide device includes a first light guide part, a polygon mirror, and a second light guide part. The first part reflects and guides a laser light emitted from a laser generator. The polygon mirror rotates and includes reflective parts. The reflective parts are arranged to form a regular polygonal reflective surface when viewed in a rotation axis direction, the polygon mirror reflecting the light guided by the first part by the reflective part while rotating. The second part reflects the light reflected at the reflective part and guides the light so that the light is irradiated to the workpiece at each of the reflective parts. The reflective part reflects the incident light so that the optical axis of the incident light offset in the rotation axis direction. At least two reflective parts differ from each other in position in the rotation axis direction.

5 Claims, 7 Drawing Sheets

(51) Int. Cl.
*G02B 26/12* (2006.01)
*B23K 101/18* (2006.01)

(56) References Cited

U.S. PATENT DOCUMENTS

| | | | |
|---|---|---|---|
| 2008/0239432 A1* | 10/2008 | Itami | G02B 5/09 |
| | | | 359/203.1 |
| 2008/0267663 A1 | 10/2008 | Ichii et al. | |
| 2014/0036331 A1* | 2/2014 | Kuge | B23K 26/043 |
| | | | 219/121.68 |
| 2017/0184705 A1 | 6/2017 | Fujii et al. | |
| 2019/0151944 A1* | 5/2019 | Steffas | B23K 26/342 |

FOREIGN PATENT DOCUMENTS

| | | |
|---|---|---|
| JP | 2004-93680 A | 3/2004 |
| JP | 2013-116488 | 6/2013 |
| JP | 5401629 B2 | 1/2014 |
| JP | 2018097055 | 6/2018 |
| KR | 20180052379 | 5/2018 |
| WO | 2012-120892 A1 | 9/2012 |

* cited by examiner

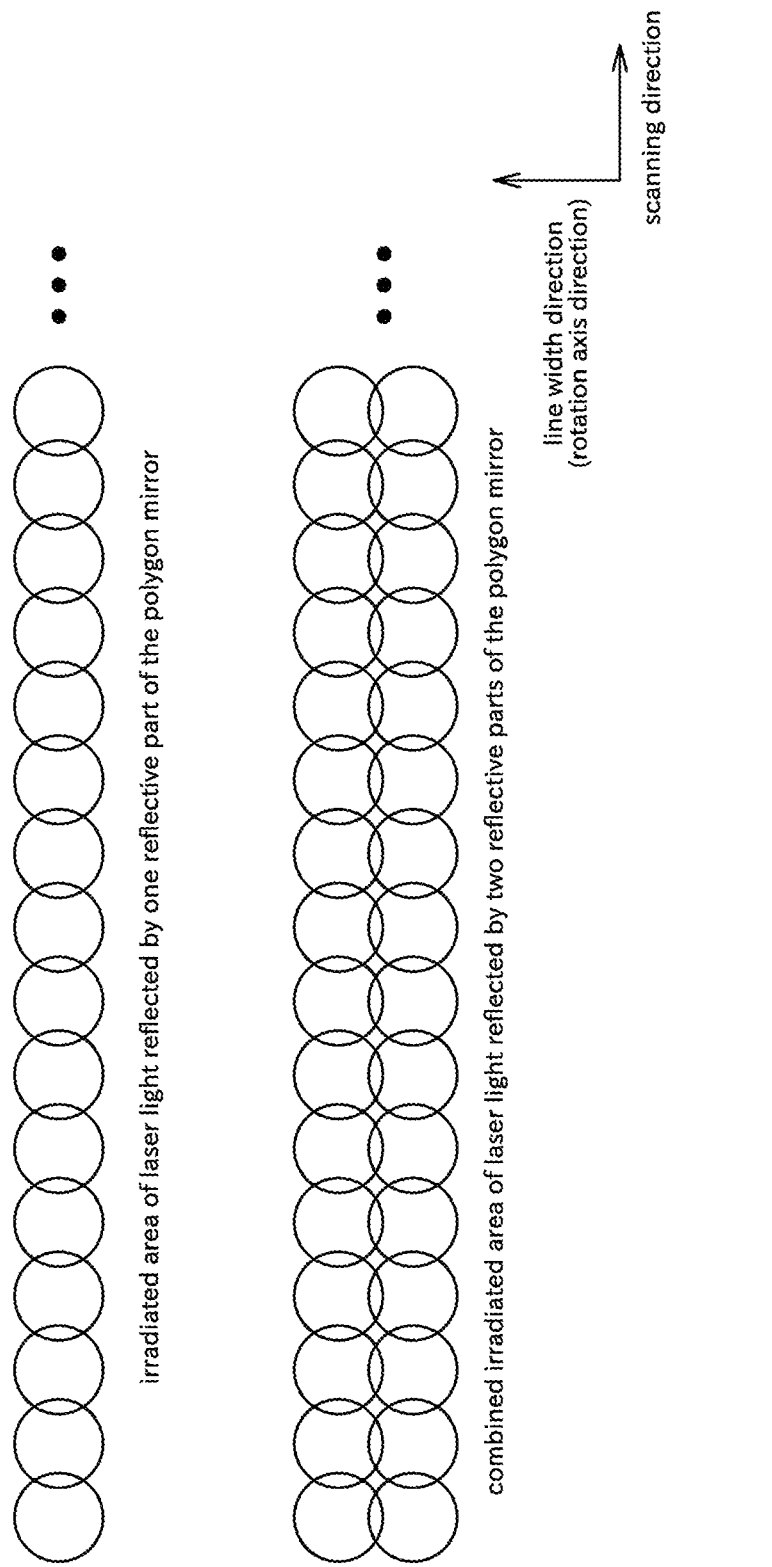

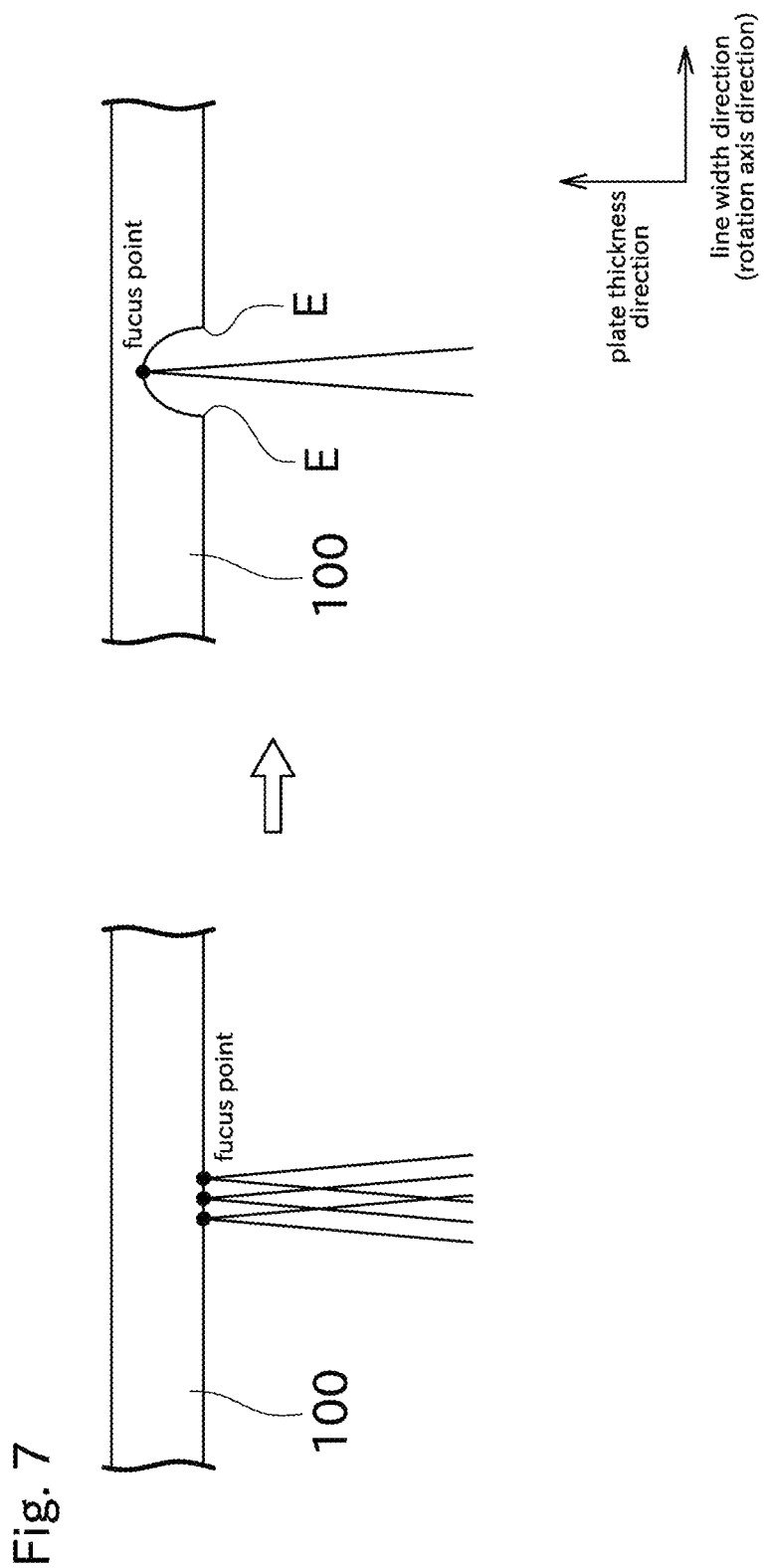

LIGHTGUIDE DEVICE AND LASER PROCESSING DEVICE

TECHNICAL FIELD

The present invention mainly relates to a light guide device for scanning a light using a mirror having a plurality of reflective surfaces.

BACKGROUND ART

Conventionally, a technology of scanning a light from a light source along a scanning line which is a straight line has been widely used in image forming devices and laser processing devices. PTL 1 disclose an optical scanning apparatus included in the above devices.

The optical scanning apparatus of PTL 1 comprises a light projecting means and an optical reflection means. The light projecting means has a polygon mirror. A Light incident from a certain direction is reflected on a reflective surface of each side of a regular polygon shape of the rotating polygon mirror. This causes the polygon mirror to emit light while rotating. The optical reflection means reflects the light emitted from the light projecting means by a plurality of reflective part. The optical reflection means guides the light to any irradiated point on the scanning line.

CITATION LIST

Patent Literature

PTL1: Japanese Patent No. 5401629

SUMMARY OF INVENTION

In the situation where the irradiated area is processed by irradiating the irradiation target with the light so that the irradiated area is circular or point-shaped, or in the situation where information on the irradiation target is read, it may be desirable to disperse (offset) the position of the irradiated area without moving the irradiation target. PTL 1 does not disclose a configuration to achieve that.

The present invention relates to a light guide device capable of distributing a position of an irradiated area in a line width direction without moving an irradiation target.

Solution to Problem

Problems to be solved by the present invention are as described above. Solutions to the problems and advantageous effects thereof will now be described.

An aspect of the present invention provides a light guide device as follows. The light guide device includes a first light guide part, a polygon mirror, and a second light guide part. The first light guide part reflects and guides a light emitted from a light source. The polygon mirror is configured to be rotatable. The polygon mirror includes a plurality of reflective parts, the reflective parts being arranged to form a regular polygonal reflective surface when viewed in a rotation axis direction. The light guided by the first light guide part is reflected by the rotating reflective part. The second light guide part reflects the light reflected by the reflective part of the polygon mirror and guides the light so that the light is irradiated to an irradiation target at each of the reflective parts. The reflective part of the polygon mirror is configured to reflect the incident light so that the optical axis of the incident light offsets in the rotation axis direction At least two reflective parts differ from each other in position in the rotation axis direction.

As a result, if position of the reflective parts in the rotation axis direction differs each other, the position of the light irradiated on the irradiation target also differs. Therefore, the position of the irradiated area can be distributed in the width direction without moving the irradiation target.

Advantageous Effects of Invention

One of the advantages of the present invention is that a light guide device is capable of distributing a position of an irradiated area in a width direction without moving an irradiation target.

BRIEF DESCRIPTION OF DRAWINGS

FIG. 6 A figure for explaining becoming wider of an apparent line width of a laser light.

FIG. 7 A figure showing that a position of a focus point of a laser light is changed in a thickness direction depending on a processing status of a workpiece.

DETAILED DESCRIPTION

Figure 1:
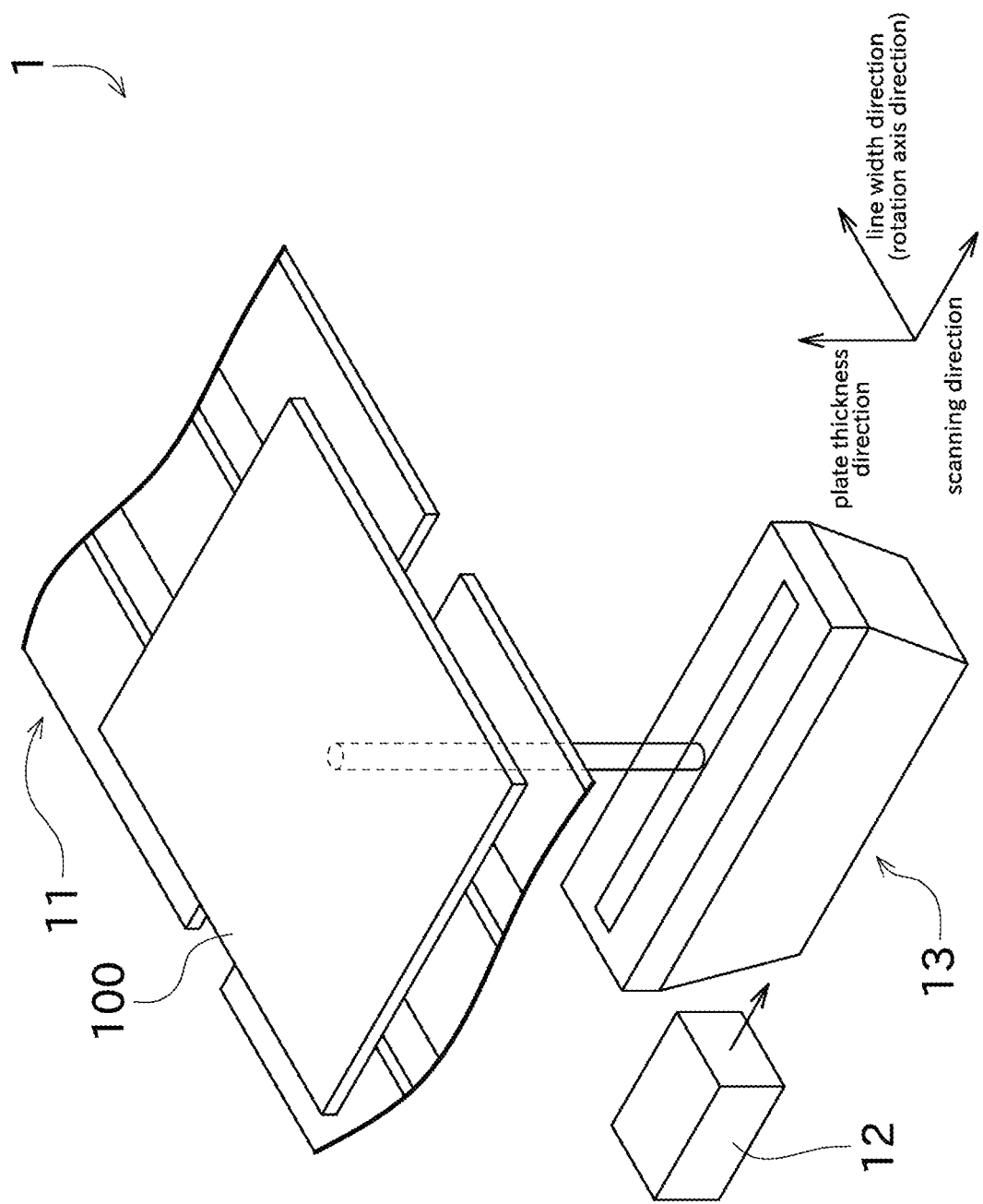
FIG. 1 A perspective view of a laser processing device according to one embodiment of the present invention.

Next, embodiments of the present invention will be described with reference to the drawings First, the configuration of a laser processing device 1 will be described with reference to FIG. 1. FIG. 1 is a perspective view of the laser processing device 1. The laser processing device 1 is a device for processing a workpiece (irradiation target) 100 by irradiating the workpiece 100 with a laser light.

The workpiece 100 in this embodiment is a plate shape object, for example, CFRP (carbon fiber reinforced plastic). The workpiece 100 may be made of other materials. The workpiece 100 is not limited to plate shaped object. The workpiece 100 may be in the form of a block, for example. The thickness direction of the workpiece 100 is defined as the plate thickness direction.

The laser processing device 1 of the present embodiment performs ablation processing by evaporating the workpiece 100 by irradiating the workpiece 100 with the laser light. The laser processing device 1 may perform thermal processing by melting the workpiece 100 by the heat of the laser light. The laser processing device 1 processes the workpiece 100 by cutting it with a laser light. The processing performed by the laser processing device 1 on the workpiece 100 is not limited to cutting, the laser processing device 1 may, for example, perform a process of removing the surface of the workpiece 100 along a predetermined shape.

The laser light may be visible light or electromagnetic wave which has wavelength band other than visible light. In this embodiment, the meaning of a word "light" includes not only visible light but also various electromagnetic waves with a wider wavelength band.

As shown in FIG. 1, the laser processing device 1 is provided with a transport unit 11, a laser generator (light source) 12, and a light guide device 13.

The transport unit 11 is a belt conveyor. The transport unit 11 transports the workpiece 100 place on the transport unit 10 in a predetermined direction. The transport unit 11 can transport the workpiece 100 in a transport direction and can stop it at a predetermined position. The transport unit 11 transports the workpiece 100 and stops the workpiece 100 at a position to perform laser processing. The transport unit 11 may be a roller conveyor, or it may be configured to grasp and transport the workpiece 100. The transport unit 11 may be omitted, and the workpiece 100, which is fixed so as not to move, may be processed by irradiating a laser light onto the workpiece 100.

The laser generator 12 generates a pulsed laser with a short time width by using pulsed oscillation. Although a time interval of the pulsed laser is not limited, the laser generator 12 generates the laser light at short time intervals, such as on the order of nanoseconds, picoseconds, or femtoseconds, for example. The laser generator 12 may generate a CW laser by using continuous wave oscillation.

The light guide device 13 guides the laser light generated by the laser generator 12 and irradiates the workpiece 100. The light guide device 13 cuts the workpiece 100 by guiding the laser light so that the focused laser light is irradiated on the surface of the workpiece 100.

Figure 2:
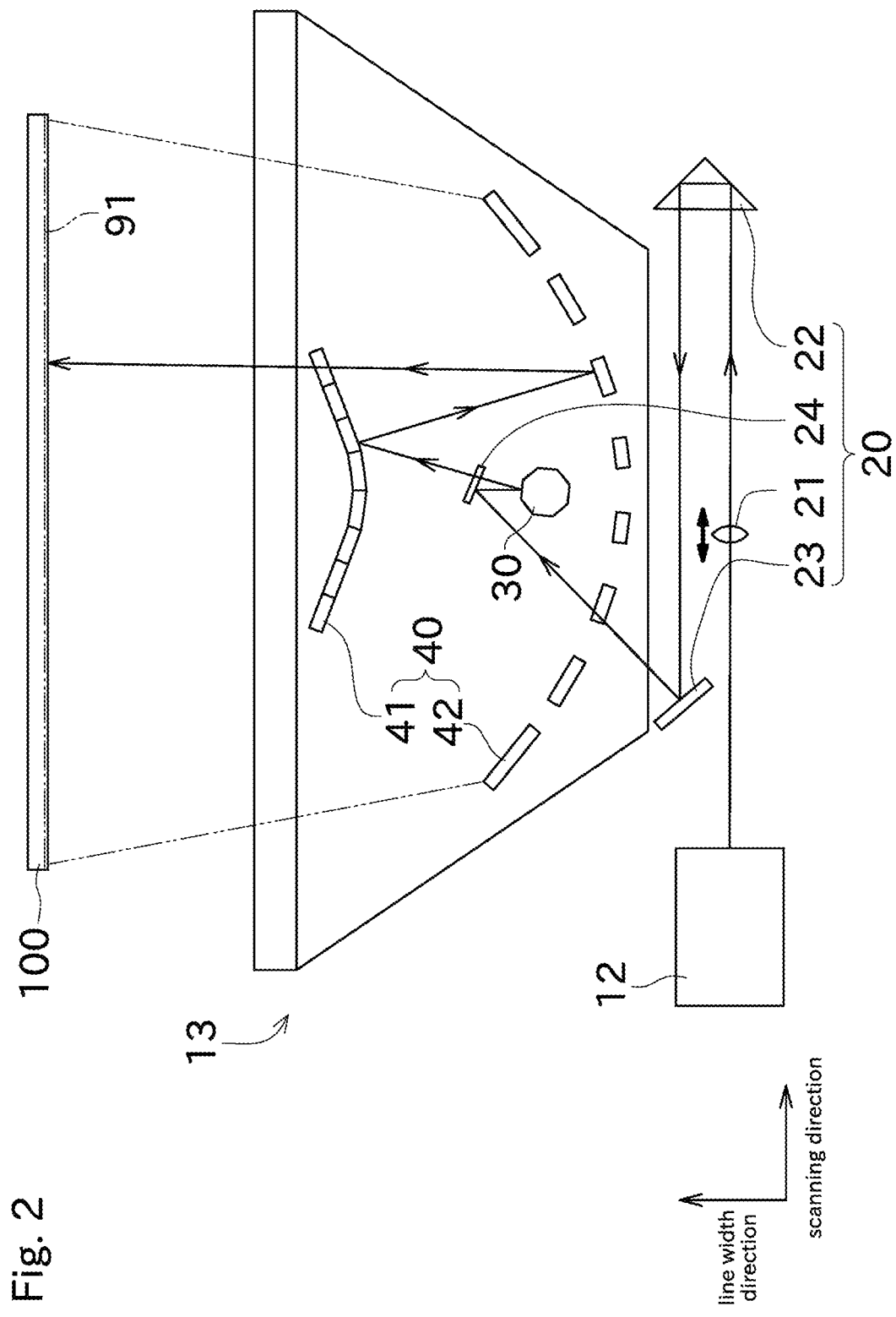
FIG. 2 A figure of an optical path of a laser light emitted from a laser generator to a workpiece.
Figure 3:
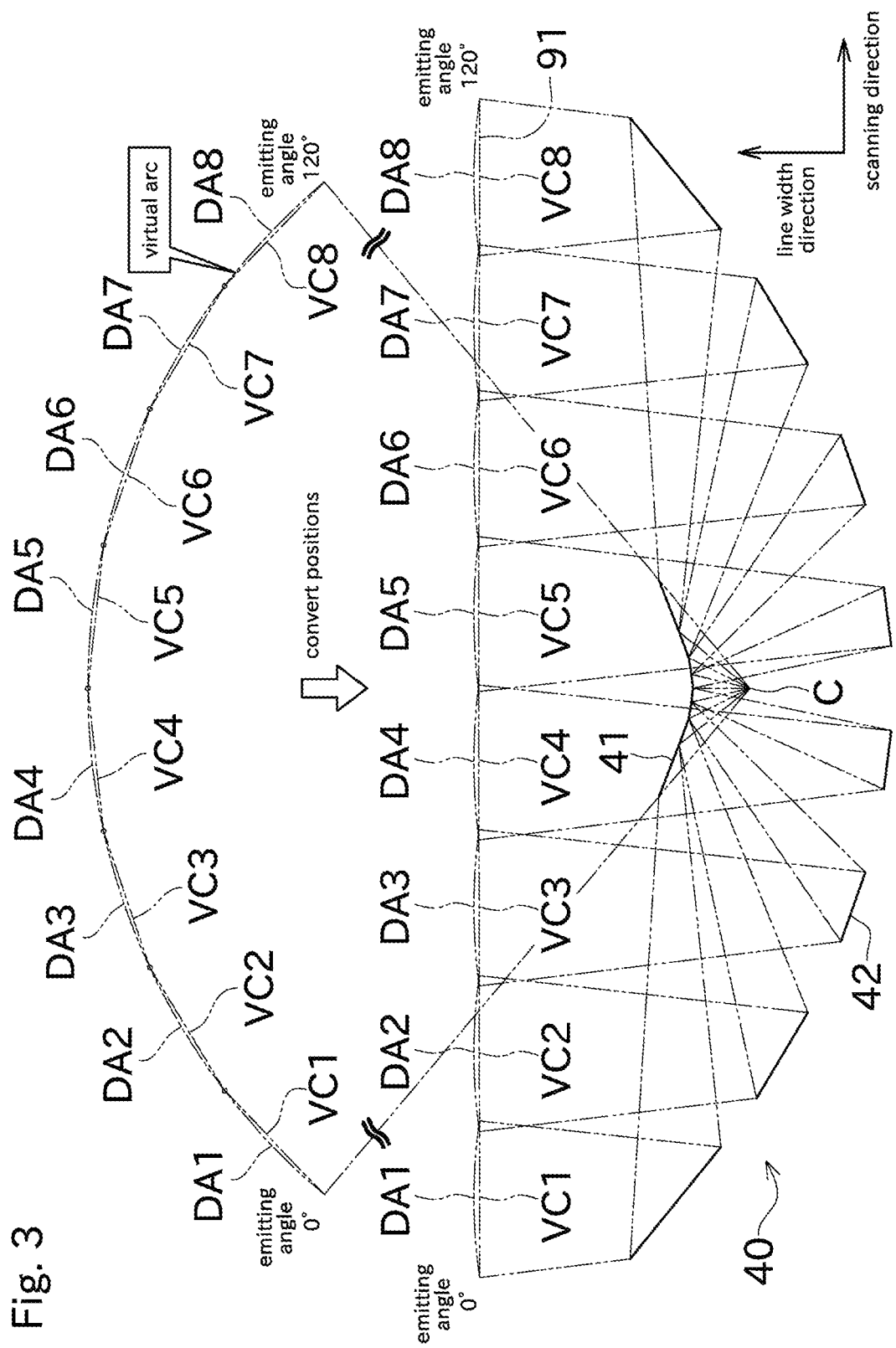
FIG. 3 A schematic figure showing a positional relationship between deflection center of a polygon mirror, a first irradiating mirror, a second irradiating mirror, and a position of a scanning line.

Referring to FIG. 2 and FIG. 3, the light guide device 13 will be described in detail below. As shown in FIG. 2, the light guide device 13 includes a first light guide part 20, a polygon mirror and a second light guide part 40. At least some of these optical components are located inside a housing of the light guide device 13.

The first light guide part 20 includes optical components that guide the laser light generated by the laser generator 12 to the polygon mirror 30. The first light guide part 20 is provided with an introductory lens 21, an introductory prism 22, a first introductory mirror 23, and a second introductory mirror 24, in order from the laser generator 12 side along the optical path of the laser light.

The introductory lens 21 focuses the laser light generated by the laser generator 12 at the focus point. The introductory prism 22, the first introductory mirror 23, and the second introductory mirror 24 guide the laser light passed through the introductory lens 21 to the polygon mirror 30. The introductory prism 22, the first introductory mirror 23, and the second introductory mirror 24 comprise an optical unit. The optical unit bends the optical path upstream of the polygon mirror 30 to provide an optical path length necessary to position the focus point on the surface of the workpiece 100. The optical components comprising the first light guide part 20 shown in this embodiment can be omitted accordingly. Other prisms or mirrors may be added between the introductory lens 21 and the polygon mirror 30, as appropriate.

As shown in FIG. 2, the polygon mirror 30 is formed as a whole in a regular polygonal shape (in this embodiment, a regular octagonal shape). The polygon mirror 30 can be rotated at a constant angular speed, for example, by transmission of power from the electric motor (not shown). The rotation axis direction of the polygon mirror 30 is the same as the viewpoint direction (viewing angle) of FIG. 2 (i.e., the viewpoint direction for the polygon mirror 30 to appear as a regular polygon).

The laser light generated by the laser generator 12 and reflected by the polygon mirror 30 is guided by the second light guide part 40 and irradiated on the workpiece 100. The irradiation position of the laser light is changed according to the angle of the reflective surface of the polygon mirror 30. In other words, as the polygon mirror 30 rotates, the laser light from the laser generator 12 is deflected and the reflection angle of the laser light at the polygon mirror 30 is changed. This causes a laser light to be scanned on the workpiece 100. Scan is to change the irradiation position of light such as laser light in a certain direction. In the following, the scanning direction of the laser light is simply referred to as the "scanning direction". The workpiece 100 is cut along the scanning direction.

The polygon mirror 30 emits laser light introduced by the second introductory mirror 24 and the polygon mirror 30 rotates so that the laser light introduced by the second introductory mirror 24 is moved at a constant angularly speed. The second light guide part 40 reflects the light emitted from the polygon mirror 30 and guides the light to the scanning line 91. As the rotation angle of the polygon mirror 30 changes, the irradiation position moves sequentially in the scanning direction along the scanning line 91 on the workpiece 100.

The second light guide part 40 has a plurality of reflective surfaces, which reflect the laser light reflected by the polygon mirror 30 and guide it to the surface of the workpiece 100 as appropriate. The second light guide part 40 has a plurality of first irradiating mirrors 41 and a plurality of second irradiating mirrors 42.

The arrangement and function of the second light guide part 40 will be described below with reference to FIG. 3. FIG. 3 is a schematic figure showing a positional relationship between a deflection center C, a first irradiating mirror 41, a second irradiating mirror 42, and a scanning line 91.

If the second light guide part 40 is not present, as shown in the upper view of FIG. 3, the focus point of the laser light (a point distance away from the laser generator 12 along the optical path) draws an arc-shaped trajectory as the rotation angle of the polygon mirror 30 changes by an amount corresponding to one side of the regular polygon. The center of this trajectory is the deflection center C, where the laser light is deflected by the polygon mirror 30, and the radius of the trajectory is the optical path length from said deflection center C to the focus point. On the other hand, the scanning line 91 extends in a straight line in the scanning direction, unlike the arc-shaped trajectory. As a result, the distance from the irradiation position on the scanning line 91 to the focus point changes according to the irradiation position. Therefore, considering the optical path length from the deflection center C mentioned above to any irradiation position on the scanning line 91, the optical path length is not constant and varies according to the irradiation position.

A second light guide part 40 is provided to solve this problem, reflecting the laser light from the polygon mirror 30 at least twice before the workpiece 100 (scanning line 91). The second light guide part 40 is arranged so that the optical path length from the reflective surface of the polygon mirror 30 to any irradiation position on the scanning line 91 on the workpiece 100 is approximately constant for all irradiation positions, respectively.

The second light guide part 40 in the present embodiment has a first irradiating mirror 41 which reflects the laser light from the polygon mirror 30, and a second irradiating mirror 42 which further reflects the laser light from the first irradiating mirror 41. In other words, the second light guide part 40 reflects the laser light from the polygon mirror 30 twice. The second light guide part 40 includes a first irradiating mirror 41 and a second irradiating mirror 42. The second light guide part 40 may be configured with optical components arranged such that the laser light is reflected three or more times.

As described above, if the first irradiating mirror 41 and the second irradiating mirror 42 were not present, the focus point of trajectory of the laser light is an arc (hereinafter referred to as a virtual arc) around the deflection center C as the emitting angle of light output changes. The radius R of the virtual arc is the optical path length from the deflection center C to the focus point. The first irradiating mirror 41 and the second irradiating mirror 42 bend the optical path from the deflection center C to the focus point, thereby transforming the virtual arc to extend generally in a straight line in the scanning direction on the workpiece 100. In detail, the positions of the divided arcs DA1, DA2, . . . , which split the virtual arcs are transformed by the second light guide part 40 so that the orientation of each of its strings VC1, VC2, . . . is approximately equal to the scanning line 91.

The first irradiating mirror 41 and the second irradiating mirror 42 each have a plurality of reflective surfaces. The split angle range is a range of the emitting angle of the laser light from the polygon mirror 30 divided into multiple ranges. A split arc DA1, DA2, . . . is a trajectory drawn by a point (focus point) at a certain distance from the laser generator 12 along the light as the emitting angle of the light changes in the split angle range. In such a way that the split arcs VC1, VC2, . . . of the split arcs DA1, DA2, . . . are in the same direction as the scanning direction (so that they line up in the scanning direction), the first irradiating mirror 41 and the second irradiating mirror 42 reflect the light multiple times.

The specific method for transforming the position of the virtual arc to match the scanning line 91 will be briefly described. First, by dividing the virtual arc into equally spaced portions, a plurality of split arcs DA1, DA2, . . . are obtained. Next, we obtain a plurality of virtual strings VC1, VC2, . . . corresponding to each of the plurality of split arcs DA1, DA2, . . . Next, the positions and directions of the reflective surfaces possessed by the first irradiating mirror 41 and the second irradiating mirror 42 respectively are determined so that a plurality of virtual strings VC1, VC2, . . . are sequentially lined up in a straight line in the scanning direction on the workpiece 100.

When the scanning line 91 is formed in this manner, the two points at both ends of the split arc DA1, DA2, . . . are relocated on the scanning line 91, and the split arc DA1, DA2, . . . (i.e., the curve connecting two points) is relocated downstream in the optical axis direction from the scanning line 91. The focus point of the laser light moves along the split arc DA1, DA2, . . . with the position transformed in this way.

When the virtual arc is divided to multiple split arcs DA1, DA2, . . . , the split arcs DA1, DA2, . . . approximate the corresponding virtual strings VC1, VC2, . . . with high accuracy. Therefore, the optical path length from the deflection center C of the polygon mirror 30 to any irradiation position on the scanning line 91 is approximately constant over all irradiation positions. Since the split arcs DA1, DA2, . . . are in high accuracy approximation with the corresponding virtual strings VC1, VC2, . . . , the behavior of the focus point in the respective split arcs DA1, DA2, . . . approximates with high accuracy the constant velocity linear motion along the scanning line 91.

As the number of divisions of the split arc DA1, DA2, . . . increases, the distance between the midpoint of the virtual string VC1, VC2, . . . and the midpoint of the split arc DA1, DA2, decreases, and the locus of focus point approaches the virtual string VC1, VC2, . . . This allows for a high degree of consistency in optical path length. The number of divisions can be determined as appropriate depending on the error allowed by the light guide device 13.

Thus, the second light guide part 40 allows the surface of the workpiece 100 to be properly processed by the second light guide part 40 because the focus point of the laser light is located on the surface of the workpiece 100.

In the present embodiment, the beam diameter at the processing point is very small because the workpiece 100 is processed with a short-pulse laser light to concentrate the energy. Therefore, depending on the material and thickness of the workpiece 100, it may be necessary to irradiate the laser light at the same position multiple times. However, in this case, the shape of the groove formed in the workpiece 100 by the laser light may be curved, causing process saturation and making it impossible to cut. The process saturation is a phenomenon in which the energy of the laser does not transfer to ablation, but changes to heat.

Figure 4:
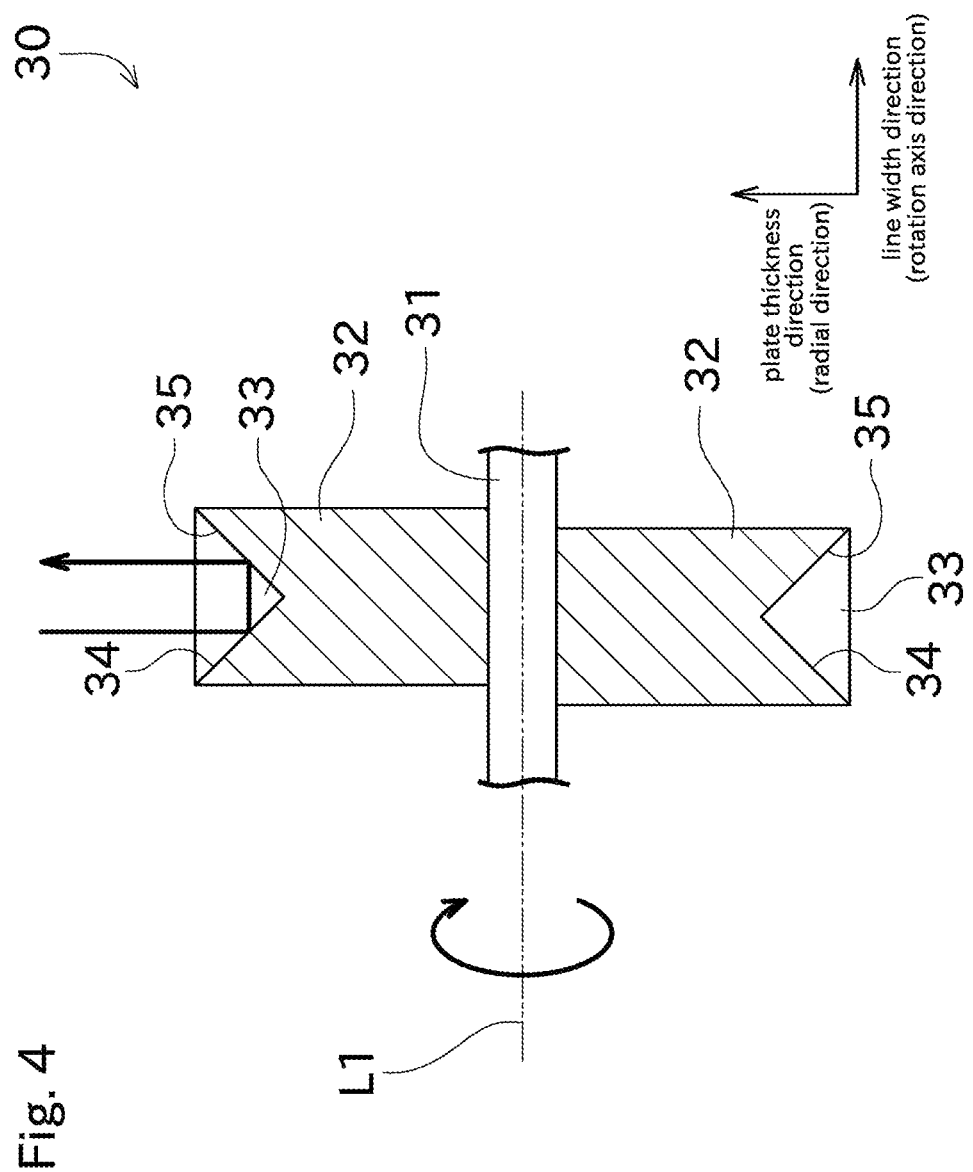
FIG. 4 A cross-sectional view showing that a position of the reflective parts of a polygon mirror in a rotation axis direction differs.
Figure 5:
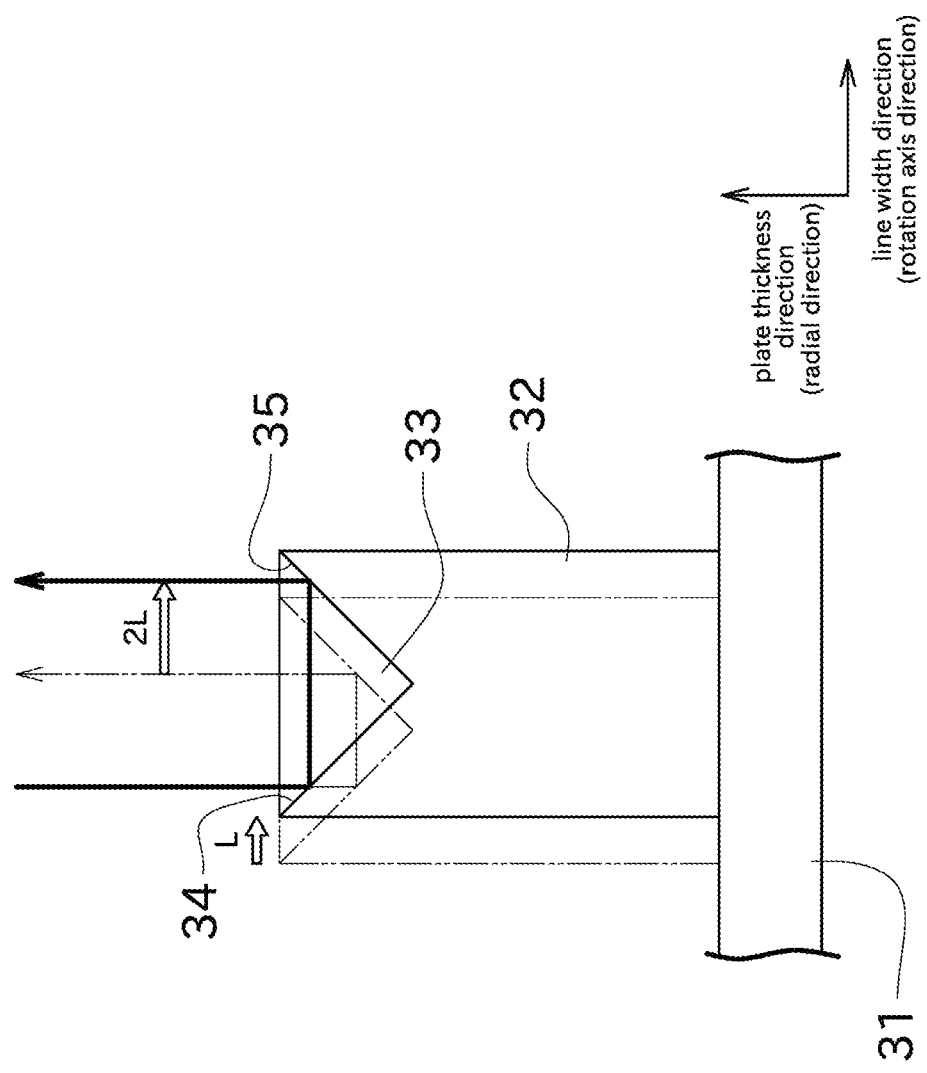
FIG. 5 A figure showing that a position of a reflective part of a polygon mirror in a rotation axis direction changes because of changing an amount of offset of reflected light relative to an incident light.

Considering the above, in the present embodiment, the workpiece 100 is processed by distributing the scanning line 91, which is the irradiation position of the laser light, by the light guide device 13. This configuration will be described below with reference to FIG. 4 and FIG. 5. FIG. 4 is a cross-sectional view showing that the position of the reflective parts 33 of the polygon mirror 30 in the rotation axis direction differs. FIG. 5 is a figure showing that the position of the reflective part 33 of the polygon mirror 30 in the rotation axis direction changes because of changing an amount of offset of the reflected light relative to the incident light.

As shown in FIG. 4, the polygon mirror 30 has a rotation shaft 31, a plurality of supports 32, and a plurality of reflective parts 33.

The rotation shaft 31 is a shaft member for rotating the polygon mirror 30, as described above. The rotation shaft 31 is driven by the above-described electric motor (not shown) with the rotation axis line L1 as the rotation center. The direction parallel to the rotation axis line L1 is called the rotation axis direction.

The plurality of supports 32 are fixed to the rotation shaft 31 and rotate integrally with the rotation shaft 31. The direction that spreads outward radially around the rotation axis line L1 is called the radial direction. One side in the radial direction that extends away from the rotation axis line L1 is referred to as the outside of the radial direction, and the other side in the radial direction approaching the rotation axis line L1 is referred to as the inside of the radial direction. The supports 32 are arranged in such a way that when viewed in the rotation axis direction, the outer edges in the radial direction constitute each side of a regular polygon. The support 32 is provided in the same number as the vertices of the regular polygon mirror 30. A triangular-shaped groove is formed at the outer end of the support 32 in the radial direction, as shown in FIG. 4 and FIG. 5, and a reflective part 33 is disposed in this groove.

The reflective part 33 is a right-angle isosceles triangle-shaped prism with a base angle of 45 degrees. The reflective part 33 is arranged so that the oblique side is perpendicular to the incident laser light. The two sides except the oblique side of the reflective part 33 function as the first reflective surfaces 34 and second reflective surface 35, respectively.

With this configuration, the travel direction of the laser light incident on the reflective part 33 is changed by reflection as shown by the bold line in FIG. 4. In the following, the explanation of the change in the scanning direction among the changes in the travel direction of the laser light will be omitted. As shown in FIG. 4, the laser light incident on the reflective part 33 travels inside of the radial direction. The laser light is reflected at the first reflective surface 34, which changes the travel direction by 90 degrees, and the reflected laser light travel to the second reflective surface 35. The laser light is reflected again at the second reflective surface 35, which changes the travel direction by 90 degrees. That is, the incident and reflected light of the laser light are parallel, and their positions of the rotation axis direction are different.

Conventionally, each position of the reflective parts 33 in the rotation axis direction is the same. On the other hand, in this embodiment, as shown in FIG. 4, position of some reflective parts 33 in the rotation axis direction are different. In other words, the position of all reflective parts 33 in the rotation axis direction may be different, or if the position is different between some reflective parts 33, the position may be the same between some of the reflective parts 33.

The position of the reflective part 33 in the rotation axis direction changes, thereby changing the amount of offset of the laser light in the rotation axis direction, as shown in FIG. 5. In FIG. 5, one reflective part 33 and one laser light etc. are shown as a chain line and another reflective part 33 and another laser light, etc. with different positions in the rotation axis direction are shown as solid lines. As shown in FIG. 5, if the position of the reflective part 33 in the rotation axis direction differs by a distance L, the amount of offset changes by a distance 2L. This is because the distance L affects both the incident position of the first reflective surface 34 of the laser light and the incident position of the second reflective surface 35 of the laser light.

The rotation axis direction of the polygon mirror 30 is the same as the line width direction (width direction) of the irradiated area of the laser light on the workpiece 100. Therefore, due to the different positions of the reflective part 33 and different amounts of offset, the laser light is irradiated at a dispersed (offset) position in the line width direction.

Specifically, as shown in the upper view of FIG. 6, the irradiated area of each pulse of laser light reflected by one reflective part 33 of the polygon mirror 30 is circular in shape. By combining these circular irradiated areas in the same direction, a linearly spread irradiated area in a certain direction is achieved.

If the position of the reflective part 33 for reflecting the laser light in the rotation axis direction is different from the position of the immediately preceding reflective part 33 in the rotation axis direction, the irradiated area is dispersed in the line width direction, as shown in the lower view of FIG. 6. In particular, in this embodiment, in all the reflective parts 33 included in the polygon mirror 30, the position of the reflective part 33 is defined so that there is no laser light whose irradiated area is separated from the others. In other words, the position of the reflective part 33 is defined so that the irradiated area realized by one reflection section 33 overlaps the irradiation area realized by any other reflection section 33.

As a result, when the polygon mirror 30 is rotated one revolution, all the laser beams form an irradiated area that spreads out in a straight line in a certain direction. Therefore, the apparent line width of the irradiated area of the laser light can be made wider. Therefore, the processing area can be enlarged. In addition, since the laser light can be prevented from being continuously irradiated at the same position only, the above-mentioned process saturation is unlikely to occur, and the workpiece 100 can be reliably cut in a short time.

Next, referring to FIG. 7, the configuration that brings the focus point of the laser light relatively close to the processing position of the workpiece 100 according to the processing status of the workpiece 100 will be described.

As shown in FIG. 7, the position of the surface of the workpiece 100 (i.e., the processing position) is changed by evaporating or melting the workpiece 100 by the laser light to remove it. Specifically, the processing position changes in the direction of the thickness of the plate and, in detail, downstream of the direction of laser irradiation.

Therefore, in this embodiment, the position of the focus point of the laser light relative to the processing position of the workpiece 100 is changed to bring the focus point and processing position closer relative to each other. The method of changing the relative position of the focus point of the laser light includes, for example, a method of moving the workpiece 100 upstream in the direction of the laser irradiation. This allows the laser light to be focused at the processing position, thus allowing the workpiece 100 to be processed efficiently.

In the conventional configuration where the irradiated area of the laser light cannot be changed in the line width direction, the width of the processing grooves is narrow. Therefore, when the focus point is changed, the laser light may hit the edge E when the processing groove becomes deeper. In this case, energy is consumed at this edge E, which may reduce the heat density at the focus point and cause process saturation, making it difficult to process.

In contrast, in the present embodiment, since the irradiated area of the laser light is varied in the line width direction, the width of the processing groove can be widened and the apparent line width of the irradiated area of the laser light can be widened. Therefore, by varying the focus point, the laser light in the middle of the apparent line width is less affected by the edge E. As a result, process saturation can be prevented and processing can continue properly.

In order to control the focus point of the laser light relative to the processing position of the workpiece 100 according to the depth of the processing groove of the workpiece 100, the depth of the current processing groove of the workpiece 100 must be estimated or detected. Specifically, it is possible to estimate the depth of the processing groove of the workpiece 100 based on the number of times the laser is irradiated and the time elapsed since the start of processing, or the depth of the processing groove of the workpiece 100 can be detected by detecting the shape of the workpiece 100 by light or sound waves or the like. By using the depth of the processing groove obtained in this way, the focus point of the laser light can be adjusted according to the depth of the processing groove. The number of times the focus point position may be changed once or multiple times for a single laser process (in this embodiment, one workpiece 100 is cut).

As described above, the light guide device 13 of this embodiment includes the first light guide part 20, the polygon mirror 30, and the second light guide part 40. The first light guide part reflects and guides the laser light emitted from the laser generator 12. The polygon mirror 30 is configured to be rotatable and includes a plurality of reflective parts 33, the reflective parts 33 being arranged to form the regular polygonal reflective surface when viewed in the rotation axis direction, the polygon mirror reflecting the laser light guided by the first light guide part 20 by the reflective part while rotating. The second light guide part 40 reflects the laser light reflected at the reflective part 33 of the polygon mirror 30 and guides the light so that the laser light is irradiated to the workpiece 100 at each of the reflective parts 33. The reflective part 33 of the polygon mirror 30 is configured to reflect the incident laser light so that the optical axis of the incident light offset in the rotation axis direction. At least two reflective parts 33 differ from each other in position in the rotation axis direction.

As a result, if the position of the optical axis of the light incident on the reflective part 33 differs in the rotation axis direction, the position of the light irradiated on the workpiece 100 also differs. Therefore, the position of the irradiated area can be distributed in the width direction without moving the workpiece 100.

In the light guide device 13 of this embodiment, each of the irradiated areas of the plurality of light irradiated on the workpiece 100 while the polygon mirror 30 is rotated one revolution overlaps with at least one other irradiated area in the line width direction.

This allows the apparent line width of the irradiated area wider since the laser light can be irradiated on the workpiece 100 without any gaps.

The laser processing device 1 of this embodiment includes the light guide device 13 and the laser generator 12. The laser generator 12 generates the laser light.

This makes it possible to process various materials efficiently, since the laser light can be irradiated so that the position of the irradiated area in the line width direction is distributed.

In the laser processing device 1 of this embodiment, the workpiece 100 is plate shaped. The workpiece 100 is irradiated with a laser light multiple times so that the irradiated areas overlap. The laser processing device 1 brings the focus point of the laser light relatively close to the processing position of the workpiece 100, depending on the depth of the processing groove of the workpiece 100.

This allows the focus point to be brought closer to the machining position even if the machining operation of the workpiece 100 progresses and the processing groove becomes deeper.

While a preferred embodiment of the present invention has been described above, the configurations described above may be modified, for example, as follows.

In this embodiment, the position of the polygon mirror 30 (reflective part 33) in the rotation axis direction is fixed and cannot be changed, but a push-pull bolt (position adjustment tool) or the like may be provided for changing the position of the polygon mirror 30 (reflective part 33) in the rotation axis direction. The push-pull bolt may be provided on all polygon mirrors or only on some polygon mirrors 30.

In this embodiment, the reflective part 33 is a prism, but it may be configured with a mirror disposed at a position corresponding to the first reflective surface 34 and the second reflective surface 35, respectively.

Although the above embodiment describes an example of applying the light guide device 13 to the laser processing device 1, the light guide device 13 can also be applied to other devices, such as an image forming apparatus, for example. The image forming device is a device that forms a toner image by irradiating a photosensitive drum with light. In this case, a light source other than a laser light (e.g., an LED lamp) can be used as a light source.

REFERENCE SIGNS LIST 1 laser processing device
12 laser generator (light source)
13 light guide device
20 first light guide part
30 polygon mirror
31 rotation axis
32 supporter
33 reflective part
34 first reflective surface
35 second reflective surface
40 second light guide part
100 workpiece (irradiation target)

The invention claimed is:

1. A light guide device, comprising:
a first light guide part reflecting and guiding light emitted from a light source;
a rotatable polygon mirror including a first reflective part and a second reflective part, each of the first and second reflective parts including an upstream reflective surface and a downstream reflective surface each configured to reflect the light guided by the first light guide part such that an optical axis of the light offsets in a rotation axis direction; and
a second light guide part reflecting the light reflected by the first and second reflective parts of the polygon mirror and guiding the light so that the light is irradiated to an irradiation target at each of the first and second reflective parts,
wherein a first position of the first reflective part is indicative of (A) a first boundary position between the upstream reflect surface of the first reflective part and the downstream reflective surface of the first reflective part and (B) a first position on a central axis of the polygon mirror,
wherein a second position of the second reflective part is indicative of (A) a second boundary position between the upstream reflect surface of the second reflective part and the downstream reflective surface of the second reflective part and (B) a second position on the central axis of the polygon mirror, and
wherein the first position of the first reflective part is different from the second position of the second reflective part.

2. The light guide device according to claim 1, wherein each light irradiated area of a plurality of light irradiated areas on the irradiation target while the polygon mirror is rotated one revolution overlaps with at least one other irradiated area in a width direction.

3. A laser processing device, comprising:
a light source generating a laser light; and
a light guide device includes:
a first light guide part reflecting and guiding the light emitted from the light source;
a rotatable polygon mirror including a first reflective part and a second reflective part, each of the first and second reflective parts including an upstream reflective surface and a downstream reflective surface each configured to reflect the light guided by the first light guide part such that an optical axis of the light offsets in a rotation axis direction; and
a second light guide part reflecting the light reflected by the first and second reflective parts of the polygon mirror and guiding the light so that the light is irradiated to an irradiation target at each of the first and second reflective parts,
wherein a first position of the first reflective part is indicative of (A) a first boundary position between the upstream reflect surface of the first reflective part and the downstream reflective surface of the first reflective part and (B) a first position on a central axis of the polygon mirror, wherein a second position of the second reflective part is indicative of (A) a second boundary position between the upstream reflect surface of the second reflective part and the downstream reflective surface of the second reflective part and (B) a second position on the central axis of the polygon mirror, and wherein the first position of the first reflective part is different from the second position of the second reflective part.

4. The laser processing device according to claim 3, wherein the irradiation target is a plate, wherein the laser processing device irradiates the irradiation target with the laser light at a plurality of times so that a light irradiated area overlaps in a width direction, and wherein a focus point of the laser light is brought closer to an irradiated position relatively depending on a depth of a processing groove of the irradiation target.

5. The laser processing device according to claim 3, wherein each light irradiated area of a plurality of light irradiated areas on the irradiation target while the polygon mirror is rotated one revolution overlaps with at least one other irradiated area in a width direction.

\* \* \* \* \*